July 4, 1939.   O. E. TRAUTMANN   2,164,847
PROJECTOR
Filed July 2, 1937   2 Sheets-Sheet 1

OTTO E. TRAUTMANN
INVENTOR.

BY
ATTORNEYS

July 4, 1939.　　　O. E. TRAUTMANN　　　2,164,847
PROJECTOR
Filed July 2, 1937　　　2 Sheets-Sheet 2
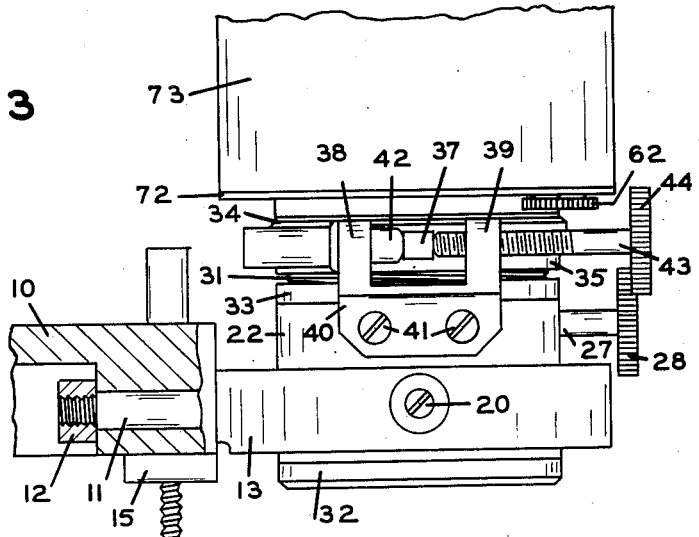
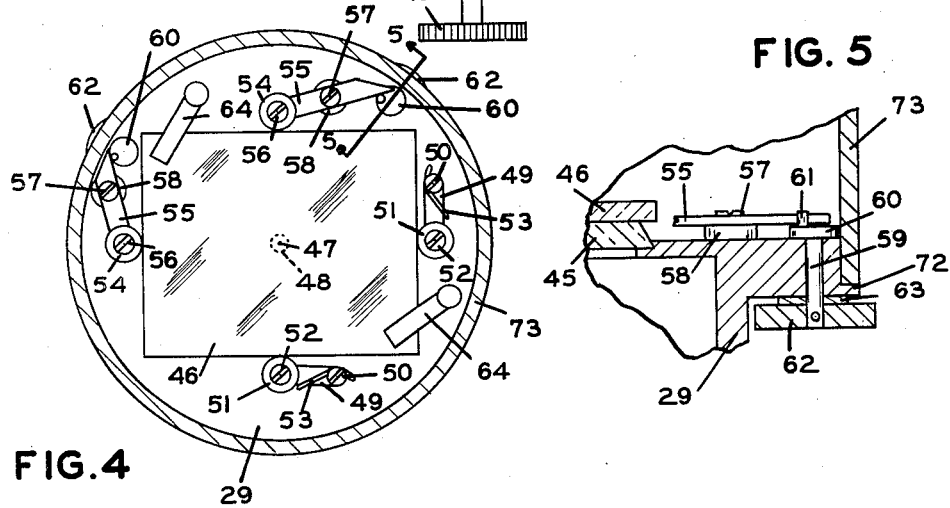
OTTO E. TRAUTMANN
INVENTOR.
BY
ATTORNEYS Patented July 4, 1939

2,164,847

UNITED STATES PATENT OFFICE 2,164,847

PROJECTOR

Otto E. Trautmann, Irondequoit, N. Y., assignor to Bausch & Lomb Optical Company, Rochester, N. Y., a corporation of New York Application July 2, 1937, Serial No. 151,689

5 Claims. (Cl. 88—24)

The present invention relates to optical apparatus and more particularly to projectors and mounting mechanisms therefor.

In aerial mapping systems such as that shown in U. S. Patent No. 1,980,657 issued November 13, 1934, to W. Bauersfeld, there are several essential conditions to be met. The diapositive must be placed in the projector so that the point intersected by the optical axis of the taking camera lies on the optical axis of the projector; the rear nodal point of the objective must lie in a fixed predetermined position relative to the diapositive; and the projector must be universally mounted in such a position that the front nodal point of the objective is at the point of intersection of the axes of the universal movement. Heretofore, these relative positions have been obtained by trial and error methods and, as a result, the projectors were difficult to manufacture, tedious to adjust and not accurately uniform.

One of the objects of the present invention is to provide a new and improved projection apparatus for aerial mapping. Another object is to provide a mapping projector having new and improved means for locating the diapositive. Another object is to provide a mapping projector having a simple, accurate and effective means for locating the objective relative to the diapositive. A further object is to provide a cardan suspension and means for accurately locating the projector in the suspension with the projection objective in predetermined relation to the suspension. These and other objects and advantages reside in certain novel features of construction, arrangement and combination of parts as will hereinafter be more fully set forth and pointed out in the appended claims.

Referring to the drawings:

Fig. 3 is a fragmentary side elevation with parts in section.

Fig. 4 is a section taken on line 4—4 of Fig. 2.

Fig. 5 is an enlarged section taken on line 5—5 of Fig. 4.

Figures 1, 2:
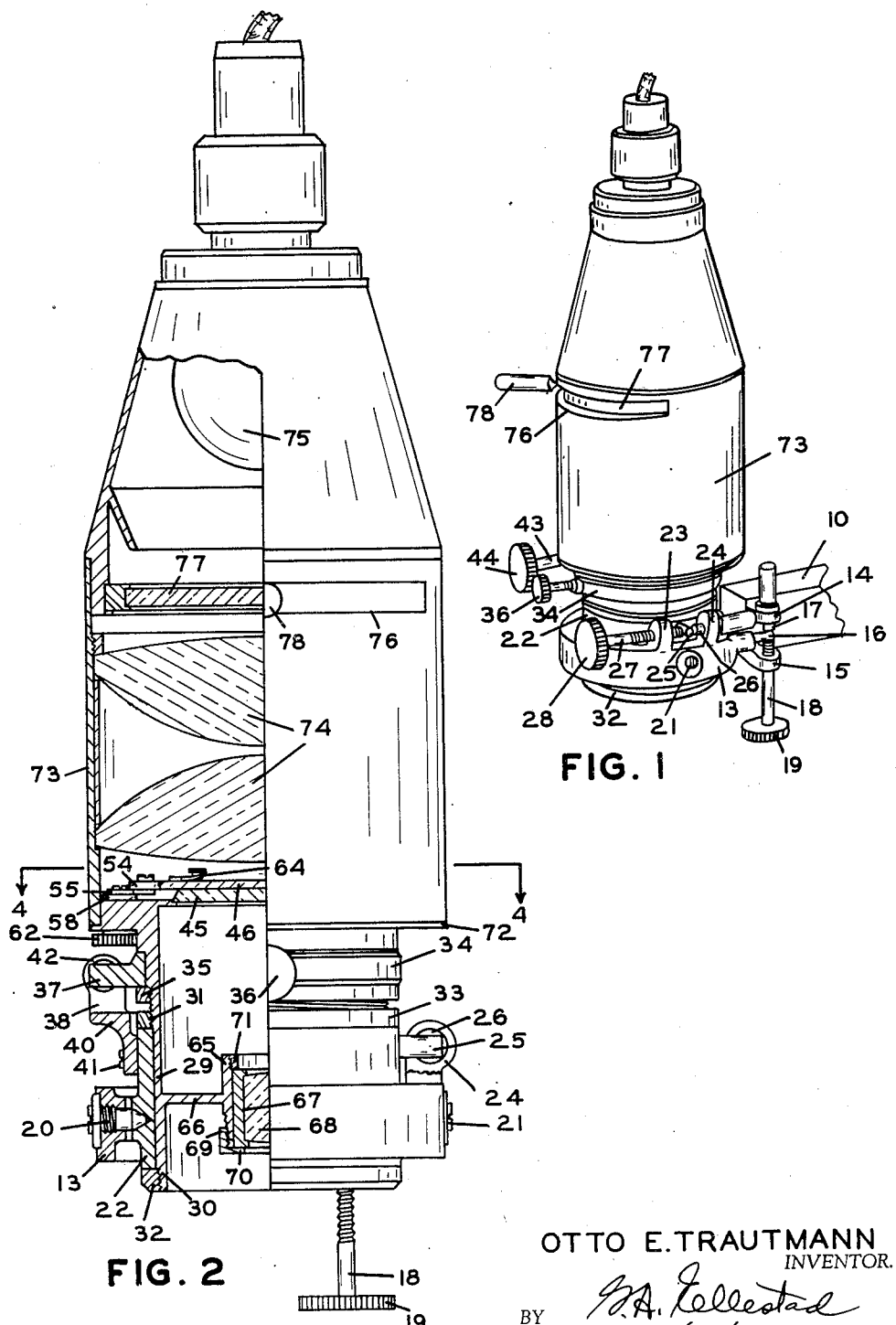
Fig. 1 is a perspective view of a projector embodying the present invention.
Fig. 2 is a front elevation thereof with parts in section.

A preferred embodiment of the present invention is illustrated in the drawings wherein 10 designates a projector supporting rod or slide. This rod or slide 10 may be suitably carried by a frame in a manner known in the art but forming no part of the present invention. A shaft 11 rotatably journalled in the rod 10 is held against axial movement by a nut 12 and carries at its outer end a ring 13. The slide 10 is provided with two laterally projecting ears 14 and 15 and a pin 16, secured to the ring 13, extends between these ears. A spring pressed plunger 17, carried by the ear 14, engages the pin 16 on one side and a screw 18, threaded in the ear 15, engages the other side of the pin 16. The screw 18 is provided with a knurled knob 19 and actuation of the screw 18 causes the ring 13 to pivot on the shaft 11.

Two pivot pins 20 and 21 extend inwardly from the ring 13 and form bearings for a second ring 22. The pivotal axis of the second ring 22 formed by the pivot pins 20 and 21 is perpendicular to and coplanar with the axis of the shaft 11. The ring 13 is provided with two upstanding ears 23 and 24 and a pin 25, fixed on the second ring 22, extends between these ears. A spring pressed plunger 26, carried by the ear 23, engages one side of the pin 25 and a screw 27, threaded in the ear 24, engages the other side of the pin 25. The screw 27 is actuated by means of a knurled knob 28 and causes the second ring 22 to rock on the pivot pins 20 and 21.

A tube 29 is slidably and rotatably mounted within the second ring 22. This tube is threaded at 30 and 31 above and below the second ring 22 and collars 32 and 33 are threaded on the portions 30 and 31, respectively. The axial position of the tube 29 is determined by the positions of the collars 32 and 33 and when these collars engage the top and bottom of the second ring 22, the tube 29 is secured against axial movement but is free to rotate about an axis which intersects perpendicularly the pivotal axis of the ring 22 and the axis of the shaft 11. An annular ring 34 is rotatably secured on the tube 29 by means of a threaded collar 35 and this ring may be locked to the tube 29 by a set screw 36 which is threaded through the ring 34 and engages the tube 29. The annular ring 34 has a pin 37 which projects laterally between two upstanding ears 38 and 39 on a bracket 40 secured on the second ring 22 by screws 41. A spring pressed plunger 42, carried by the ear 38, engages one side of the pin 37 and a screw 43 threaded in the ear 39, engages the other side of the pin 37. The screw 43 is actuated by a knurled knob 44 and causes rotary movement of the annular ring 34 relative to the second ring 22. Coarse axially rotary adjustments of the tube 29 are made by releasing the set screw 36 and turning the tube 29 by hand and fine adjustments are made by tightening the set screw 36 and using the screw 43.

At the top of the tube 29 is mounted a glass plate 45 which serves as a support for a diapositive 46. The glass plate 45 is provided at its center with a suitable mark 47 and a suitable mark 48, such as a circle, is formed in the center of the diapositive 46. It is essential that the center of the diapositive 46 and the center of the plate 45 be in alignment and a suitable mechanism shown in Figs. 4 and 5 is provided to obtain this alignment.

Two identical members press against two adjacent sides of the diapositive, preferably at the center of these sides. Each of these members consists of an arm 49 pivotally mounted at one end on a screw 50 which is threaded into the tube 29. An anti-friction roller 51 is rotatably mounted on a screw 52 on the other end of the arm 49 and a spring 53 presses the arm 49 toward the slide. Opposite each of the rollers 51, the diapositive 46 is engaged by a roller 54 which is secured on a lever 55 by a screw 56. Each lever 55 is pivoted intermediate its ends on a screw 57 which is threaded into the tube 29 and the lever 55 is held in spaced relation to the tube 29 by a washer 58.

A shaft 59 is journalled in the tube 29 adjacent the free end of each lever 55 and carries a plate 60 upon which is secured an eccentric pin 61. This pin 61 engages the free end of the lever 55 and moves it toward the diapositive 46 against the action of the spring 53 and roller 51. Each shaft 59 extends outside of the tube 29 and is provided with an actuating knob 62. A friction washer 63 holds the shaft 59 in adjusted position. Two ordinary spring clips 64 engage opposite corners of the diapositive 46 and hold it flat against the glass supporting plate 45.

A sleeve 65 is fixed within the tube 29 by a web 66 and a lens cell 67 carrying the objective 68 is slidably mounted within the sleeve 65. The lower end of the sleeve 65 is externally threaded to receive a collar 69 having an internally projecting flange 70 which supports the cell 67 and objective 68. The collar 69 is rotated until the rear nodal point of the objective 68 is in a predetermined relation to the diapositive 46 and the objective 68 is then locked in this position by means of a threaded ring 71.

The tube 29 has an outwardly projecting flange 72 and the wall 73 of the lamp house, engages the outside of the tube 29 and rests on this flange 72. The lamp house contains suitable condensers 74 and a light source 75. These elements are well known in the art. A slot 76 is provided in the lamp house between the condensers 74 and light source 75 to receive a suitable filter 77 which may be inserted or removed by means of the handle 78.

In setting up the projector, the objective 68 is adjusted in the manner set forth above until its rear nodal point is at the proper predetermined position relative to the plate 45 and diapositive 46. The tube 29 without the collar 32 is then placed in the second ring 22 and the collar 33 is adjusted until the front nodal point of the objective 68 is at the point of intersection of the axes of shaft 11, ring 22 and tube 29. The collar 32 is then screwed into contact with the ring 22 and the tube 29 thus fixed against further axial movement.

From the foregoing, it will be apparent that I am able to attain the objects of my invention and provide a new and improved projection assembly for aerial mapping. Various modifications can, of course, be made without departing from the spirit of my invention or the scope of the appended claims.

I claim:

1. A projector comprising a support, a shaft pivotally mounted in said support for movement about a horizontal axis, a ring carried by said shaft, a second ring pivotally mounted in the first-named ring, the pivotal axis of the second ring being coplanar with and perpendicular to the axis of the shaft, a tube, a diapositive support at one end of said tube, a sleeve within said tube, an objective lens slidably mounted in said sleeve, means for locking said lens in said sleeve so that its rear nodal point is located a predetermined fixed distance from said diapositive support, means for slidably and rotatably mounting said tube in the second ring, means for locking said tube in said ring so that the front nodal point of the lens is coincident with the pivotal axes of the shaft and second ring, and illuminating means above said diapositive support.

2. An adjustable mount for a projector having an illuminating system, a diapositive support and an objective lens mounted within a projecting sleeve in fixed relation to said diapositive support, said mount comprising a support, a shaft rotatably mounted in said support, a ring fixed on said shaft, a second ring rotatably mounted in said first-named ring with its axis perpendicular to and coplanar with the axis of the shaft, said second ring being adapted to receive the projecting sleeve of the projector, means for sliding the sleeve axially within said second ring until the front nodal point of the objective is substantially coincident with the axes of the shaft and second ring, and means for locking the sleeve in this position.

3. An adjustable mount for a projector having an illuminating system, a diapositive support, a sleeve projecting forwardly of said diapositive support and an objective lens mounted within said sleeve in fixed relation to said diapositive support, said mount comprising a support, a shaft rotatably mounted in said support, a ring fixed at the outer end of said shaft, a second ring rotatably mounted in the first-named ring with its axis perpendicular to and coplanar with the axis of the shaft, said second ring being adapted to receive the sleeve of the projector, a collar threaded on said sleeve adapted to engage the top of the second ring, means for adjusting said collar until the front nodal point of the objective is coincident with the intersection of the shaft axis and second ring axis, and a second collar threaded on said sleeve engaging the bottom of said second ring to secure the projector in adjusted position.

4. In a projector, a device for centering a rectangular object on the optical axis of the projector comprising, two arms pivotally mounted on the projector, a bearing element at the outer end of each arm, said bearing elements engaging adjacent sides of the object, spring means for pressing each arm toward the object, two levers pivotally mounted on the projector, a bearing element at the outer end of each lever, the last-named bearing elements engaging the sides of the object opposite the first-named bearing elements, operating means for moving said levers independently toward and from said object, and means extending outside of said projectors for actuating said operating means.

5. In a projector, a device for centering a rectangular object on the optical axis of the projector comprising, two arms pivotally mounted on the projector, a bearing element at the outer end of each arm, said bearing elements engaging adjacent sides of the object, spring means for pressing each arm toward the object, two levers pivotally mounted on the projector, a bearing element at the outer end of each lever, the last-named bearing elements engaging the sides of the object opposite the first-named bearing elements, a shaft rotatably mounted in said projector adjacent each lever, an eccentric on each shaft engaging the adjacent lever to move the lever toward said object, and an operating knob on each shaft outside of said projector.

OTTO E. TRAUTMANN.